US009022586B2

(12) United States Patent
Englander (10) Patent No.: US 9,022,586 B2
(45) Date of Patent: May 5, 2015

(54) VEHICULAR MIRROR HAVING A CAMERA FOR ENHANCED VISION

(75) Inventor: Benjamin Englander, Woodmere, NY (US)

(73) Assignee: Rosco, Inc., Jamaica, NY (US)

( * ) Notice: Subject to any disclaimer, the term of this patent is extended or adjusted under 35 U.S.C. 154(b) by 1093 days.

(21) Appl. No.: 12/567,900

(22) Filed: Sep. 28, 2009

(65) Prior Publication Data

US 2010/0079883 A1   Apr. 1, 2010

Related U.S. Application Data

(63) Continuation-in-part of application No. 12/238,990, filed on Sep. 26, 2008, now abandoned, which is a continuation-in-part of application No. 11/692,444, filed on Mar. 28, 2007, now Pat. No. 7,798,659.

(60) Provisional application No. 60/786,653, filed on Mar. 28, 2006, provisional application No. 61/100,856, filed on Sep. 29, 2008.

(51) Int. Cl.
| | |
|---|---|
| *G02B 5/08* | (2006.01) |
| *G02B 7/198* | (2006.01) |
| *B60R 1/06* | (2006.01) |
| *B60R 1/072* | (2006.01) |
| *B60R 1/08* | (2006.01) |
| *B60R 1/12* | (2006.01) |

(52) U.S. Cl.
CPC ......... *B60R 1/083* (2013.01); *B60R 2001/1253* (2013.01); *Y10S 359/90* (2013.01)

(58) Field of Classification Search
USPC ................. 359/872, 877, 839, 865, 871, 900; 348/148, 151, 159
See application file for complete search history.

(56) References Cited

U.S. PATENT DOCUMENTS

| | | | |
|---|---|---|---|
| 4,436,372 | A | 3/1984 | Schmidt et al. |
| 4,822,157 | A | 4/1989 | Stout |
| 4,938,578 | A | 7/1990 | Schmidt et al. |
| 5,084,785 | A | 1/1992 | Albers et al. |
| 5,525,430 | A | 6/1996 | Chahroudi |
| 5,576,899 | A | 11/1996 | Englander |
| 5,708,522 | A | 1/1998 | Levy |
| 6,059,419 | A * | 5/2000 | Englander et al. ............ 359/872 |
| 6,151,065 | A * | 11/2000 | Steed et al. ................... 348/148 |
| 6,328,450 | B2 | 12/2001 | Englander |
| 6,447,128 | B1 * | 9/2002 | Lang et al. .................... 359/871 |
| 6,520,690 | B2 * | 2/2003 | Chu ............................. 396/419 |
| 6,630,888 | B2 * | 10/2003 | Lang et al. ............... 340/815.45 |
| 6,642,840 | B2 * | 11/2003 | Lang et al. .................... 340/435 |
| 6,698,905 | B1 * | 3/2004 | Whitehead .................... 359/872 |
| 6,700,692 | B2 | 3/2004 | Tonar et al. |
| 6,954,152 | B1 * | 10/2005 | Matthews ..................... 340/937 |
| 6,959,994 | B2 * | 11/2005 | Fujikawa et al. ............. 359/871 |
| 6,961,195 | B2 * | 11/2005 | Inagaki ......................... 359/871 |
| 2003/0098908 | A1 * | 5/2003 | Misaiji et al. ................. 348/148 |
| 2003/0193613 | A1 * | 10/2003 | Matko et al. .................. 348/375 |
| 2005/0179527 | A1 | 8/2005 | Schofield |

(Continued)

*Primary Examiner* — Ricky D Shafer
(74) *Attorney, Agent, or Firm* — Stroock & Stroock & Lavan LLP (57) ABSTRACT

A system and/or apparatus provided as a side-view or rear-view mirror for providing a plurality of independently moveable reflective surfaces to enable a driver increased visibility. To increase visibility for the driver, the system and/or apparatus includes a camera for providing images around a vehicle to the driver within a vehicle during low-light or poor lighting conditions.

14 Claims, 10 Drawing Sheets

(56) References Cited

U.S. PATENT DOCUMENTS

| | | |
|---|---|---|
| 2005/0180032 A1 | 8/2005 | Seguchi et al. |
| 2007/0229961 A1 | 10/2007 | Englander |
| 2008/0100939 A1* | 5/2008 | Brester ..................... 359/872 |
| 2009/0009874 A1 | 1/2009 | Englander |

* cited by examiner

Cutout
102

Fig. 4b

Clear window
102

Fig. 4c

One-way mirror
102

VEHICULAR MIRROR HAVING A CAMERA FOR ENHANCED VISION

CROSS-REFERENCE TO RELATED APPLICATIONS

This application is a continuation-in-part of U.S. patent application Ser. No. 12/238,990, filed Sep. 26, 2008, which is a continuation-in-part of U.S. patent application Ser. No. 11/692,444, filed Mar. 28, 2007, issued as U.S. Pat. No. 7,798,659, which claims the benefit under U.S.C. §119(e) to U.S. Provisional Patent Application 60/786,653, filed Mar. 28, 2006. As well, this application claims priority under 35 U.S.C. §119(e) to U.S. Provisional Patent Application No. 61/100,856, filed on Sep. 29, 2008. All of the above applications are incorporated herein by reference in their entirety.

FIELD OF THE INVENTION

The present invention relates generally to the field of sideview and rear-view mirrors, and in particular, to a system of mirror provided with a camera to improve visibility in lowlight situations or that may not be visible with a mirror alone.

SUMMARY OF THE INVENTION

It is one optional and/or alternative feature and advantage of the present invention to enable a driver multiple to view multiple angles around a vehicle.

It is another optional and/or alternative feature and advantage of the present invention to enable a driver to view images around a vehicle in low-light or poor lighting conditions.

These features and advantages of the present invention are achieved by providing a plurality of mirror units within a housing affixed as a side-view or rear-view of a vehicle. According to various embodiments of the present invention, each mirror unit is provided with a mirror that may be moved independently to allow a driver to select an angle of view. According to at least one embodiment of the present invention one mirror unit is provided with a rectangular mirror and a second mirror unit is provided with a convex mirror.

In one embodiment, each mirror unit is provided with a motor to allow the driver to move each mirror independently from within the vehicle. In other embodiments, the mirrors are moved manually by the driver.

In other embodiments, at least one mirror unit is provided with a camera to provide electronic images to the driver within the vehicle. In one embodiment, the camera provides standard video images. In other embodiments, the camera provided enhanced images, for example, infra-red or "nightvision" to enable to the driver to view images around the vehicle in low-light or poor lighting conditions.

In various embodiments, at least one mirror unit is provided with a window to allow the camera to capture images through the mirror. According to one embodiment, a cutout is provided in which the camera is disposed to capture images. In other embodiments, a clear window is provided through which the camera captures images. In yet other embodiments, the window is a one-way mirror through which the camera captures images without disturbing the reflective surface of the mirror.

In various embodiments, the camera is moved with the mirror. In other embodiments, the camera is capable of being moved independently of the mirror.

These, together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF THE PREFERRED EMBODIMENTS

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The present invention generally relates to side-view, rear-view and/or cross-view mirrors for large vehicles, such as school buses, transit buses and trucks. Specifically, the present invention relates to side-view, rear-view and/or cross-view mirrors containing a camera for use by a driver as an additional sight-aide.

One example of a side-view mirror example of the type that may be used for the present invention is described in U.S. Pat. No. 6,059,419, hereby incorporated by reference in its entirety. In the present invention, the side-view mirror advantageously incorporates a camera to aide a driver by providing additional information that may not be obtained by viewing an image in a side-view mirror alone. As one example, a side-view mirror is provided with a camera that provides an image to a display screen in view of the driver within the vehicle. The camera may advantageously be, for example, provided with night-vision or high sensitivity sensors to provide the driver with an image in poor lighting conditions. The camera may optionally be further provided with infrared sensors such that a driver would be able to discern heat signatures of individuals or animals within view of the camera. According to one optional embodiment, the driver may control the selection of the type of image provided by the camera, e.g., night-vision, infrared, standard, etc. Advantageously, the present invention allows a driver to turn and back up a large vehicle while able to see objects, individuals and/or animals in poor lighting conditions. In alternative optional embodiments, the camera is aided with additional lighting attached to the housing, integrated within the housing and/or attached to the side of the vehicle.

According to one embodiment, the camera may be connected to a monitor within the vehicle in a wired or a wireless manner. For example, the camera may be connected by USB, fiber optic, coaxial, component, Ethernet, HDMI, WiFi, Bluetooth, radio, etc. In some embodiments, the camera and/or monitor is wired to an existing power source associated with the vehicle. In other embodiments, dedicated additional power sources or shared power sources are provided for the monitor and/or camera unit located within the monitor and/or camera, within the vehicle engine compartment and/or in other areas of the vehicle. When the power source is located remote from the camera, wiring for the connection to the power source may optionally be disposed within the mirror pole and one or more support arms for connection to area within the vehicle.

Figure 1:
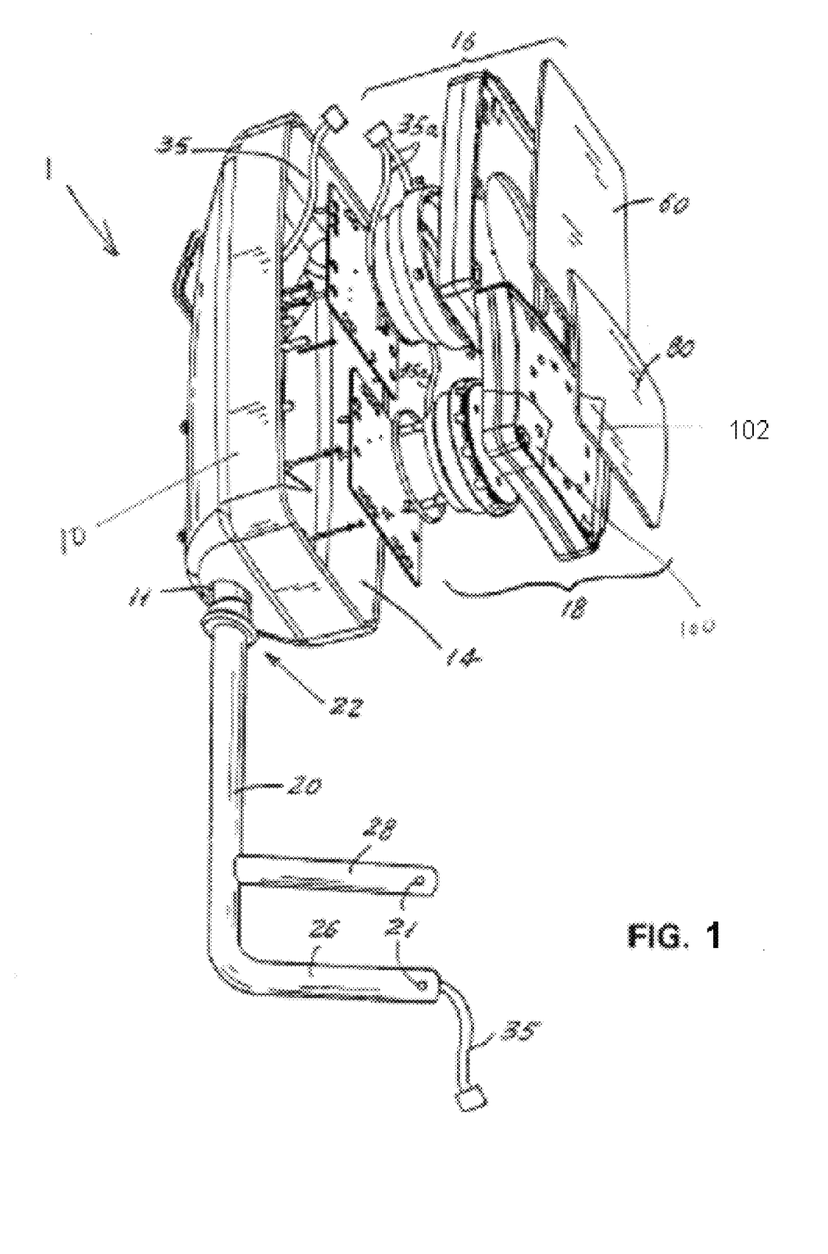
FIG. 1 is an exploded view of one embodiment of the mirror assembly of the present invention.

FIG. 1 depicts an exploded view of one embodiment of the mirror assembly of the present invention. The mirror assembly 1 comprises a shell housing 10, a mirror pole 20 and a hinge member (not shown). The shell housing 10 has a substantially rectangularly shaped opening 14 and interior space and contains a rectangularly shaped first mirror unit 16 and a convex-surfaced second mirror unit 18. An electrical cable section (or harness) 35 extends from the hinge member for providing electrical connections between a motor control switch (not shown) and the motors (not shown) contained in the first mirror unit 16 and the second mirror unit 18 via cable section 35a. First and second mirror units 16, 18 are mounted in the shell housing 10 such that the reflecting surfaces of the mirrors 60, 80 lie substantially parallel to the plane of the opening 14. First cutout 100 and second cutout 102 and are provided in a mounting plate or substrate 81 and second mirror 80, respectively, such that a camera may be positioned inline with second mirror for viewing through the first and second cutouts. In various embodiments, first and second cutouts may be provided in mounting plate or support 61 and mirror 60 such that a camera may be positioned inline with first mirror for viewing therethrough. In other embodiments, a camera is provided in both first and second mirror unit as well as accompanying cutouts.

Mounting hole 11 provides an opening for the mirror pole 20 to enter the shell housing 10. A grommet 22 is disposed in the mounting hole 11 and prevents moisture, dirt and the like from entering the shell housing 10 through the mounting hole 11. The mirror pole 20 comprises a first support arm 26 and a second support arm 28 each having a mounting hole 21 on its distal end. While FIG. 1 depicts one embodiment in which first cutout 100 and second cutout 102 are disposed in second mirror unit 18, one of ordinary skill would recognize that first and second cutouts 100, 102 could also or alternatively be disposed in first mirror unit 16 and/or in different locations in the first and/or second mirror units 16, 18. Accordingly, one or more cameras may be advantageously affixed to one or more of the mirror supports and/or mounting plates in a location corresponding to the first and/or second cutouts. Advantageously, as discussed below, when the mirror support and mirror are moved using the motors for viewing purposes, the camera attached thereto is simultaneously moved. Thus, separate controls to move the camera are not needed, and the viewing sight of the camera is advantageously adjusted in an efficient manner. In alternative embodiments, a camera may be connected to the housing 10 itself and/or the mirror mounting arms 20, 26, 28 with its own motor or adjustment device used for directing the view of the camera.

According to another embodiment, the invention is provided with a first mirror unit as described above and second mirror unit is replaced with a wide-angled camera to provide a field of view similar to the field of view of a convex mirror and/or other types of camera lenses. According to other embodiments of the present invention, more than two mirrors are provided, each mirror providing a different field of view. Advantageously, a camera may be provided in any or all of the mirrors for providing a driver with multiple fields of view on a monitor within the vehicle.

Figure 2A:
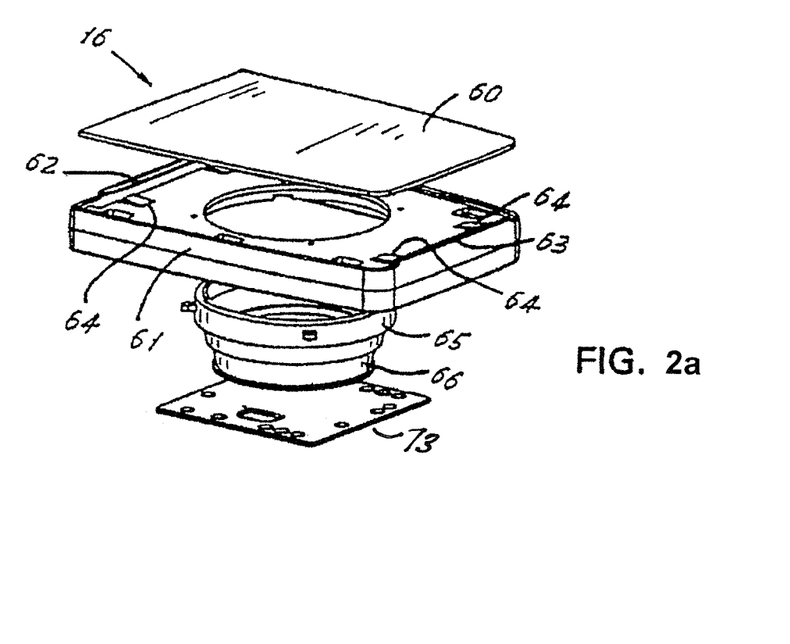
FIG. 2a-b are exploded views of one embodiment of a mirror unit of the present invention.

With reference to FIG. 2a, the rectangularly shaped first mirror unit 16 is shown in greater detail in accordance with one optional embodiment of the invention. In alternative embodiments, mirrors of different shapes and reflectivity may optionally be used. Advantageously, the rectangularly shaped mirror does not need to be flat. The first mirror unit 16 comprises a flat mirror 60, a flat mounting plate and/or support 61, a cup 65 and a swivel mechanism 66. The swivel mechanism 66 moves in relationship to the cup 65. The cup 65 is dome shaped on the bottom and operatively engages the dome shaped member of the swivel mechanism 66 which provides a swiveling motion in both horizontal and vertical directions. Gearing and swivel members (not shown) are connected to the cup 65 and to two motors (not shown) of the swivel mechanism 66 to enable motorized swiveling of the cup 65 with respect to the swivel mechanism 66 in a manner well known in the art. A boot (not shown) covers the critical elements of the swivel mechanism 66 and the cup 65 to prevent debris from deteriorating the operation of the first mirror unit 16. According to alternative embodiments of the present invention, the first mirror unit and/or the second mirror unit may also or only be moved manually, optionally using a standard manual adjustment mechanism instead of the motor actuated adjustment mechanism.

The flat mirror 60 is disposed on a flat mounting plate 61 and secured at its edges by a long snap 62 and a short snap 63. Relative ease of installation of the flat mirror 60 onto the flat mounting plate 61 is achieved by first inserting one edge of flat mirror 60 under one of the long snap 62 and the short snap 63 and then pressing the other end of flat mirror 60 under the remaining snap to obtain secure engagement of the flat mirror 60 to the flat mounting plate 61. It is preferred that one edge of the flat mirror 60 is first placed under the long snap 62 and then the other end of flat mirror 60 is snapped under short snap 63.

The ease with which the flat mirror 60 is secured to, and removed from, the flat mounting plate 61 enables field replaceability and retrofitability of the flat mirror 60, for example, when the flat mirror 60 is accidentally broken. Alternative connection systems may optionally be used to connect flat mirror 60 from flat mounting plate 61, for example, using an adhesive or other standard means for securing mirror 60 to the mounting plate 61. In addition, mirror 60 need not be flat, and other types of mirror lenses may be used, such as dome type mirror lenses.

Optional vibration tabs 64 extend somewhat above the plane of the flat mounting plate 61 and are elastically biased to engage the rear surface of the flat mirror 60 when the mirror is engaged under the long snap 62 and the short snap 63. The force exerted by the vibration tabs 64 to the rear surface of the flat mirror 60 prevents vibrations in the flat mirror 60 when the vehicle is in motion or when vibrations are transmitted to the first mirror unit 16 from other sources such as, for example, from the engine of the vehicle.

Figure 2B:
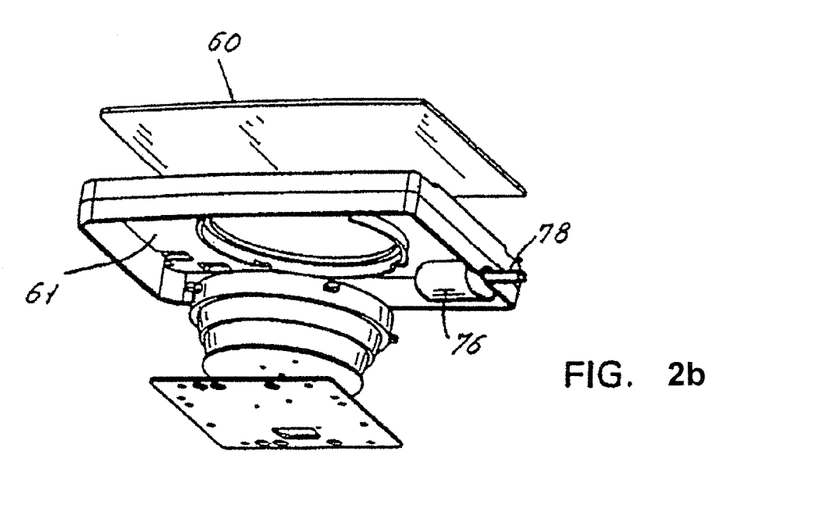

With reference to FIG. 2b, an optional electro-mechanical solenoid 76 may be coupled to the mounting plate 61, which solenoid 76 comprises a core 78 and a spring (not shown). The mounting plate 61 is provided with a hole so that the core 78 projects out of the hole. The spring forces the core 78 outwardly from the solenoid body when the solenoid 76 is not energized. When the solenoid is energized, the core 78 moves inwardly and overcomes the force exerted by the spring, which spring tends to keep the core 78 in the outward position.

The solenoid 76 is positioned such that the core 78 contacts the inside surface of the shell housing 10 when the solenoid is not energized and the spring forces the core 78 into its outward position. Therefore, when the solenoid is not energized, vibrations of the flat mounting plate 61 with respect to the shell housing 10 are damped.

However, when it is desired that the position of the first mirror unit 16 be changed via the motors of the swivel mechanism 66, the solenoid 76 is concurrently energized with the motors (via, for example, the motor control switch) such that the core 78 is drawn inwardly and away from the inside surface of the shell housing 10 thus enabling free movement of the flat plate 61 with respect to the swivel mechanism 66. Further, when the first mirror unit 16 has reached the desired position and the motors of the swivel mechanism 66 are deactivated, the solenoid 76 is also deactivated and the core 78 returns to its resting position against the inside surface of the shell housing 10.

Figure 3A:
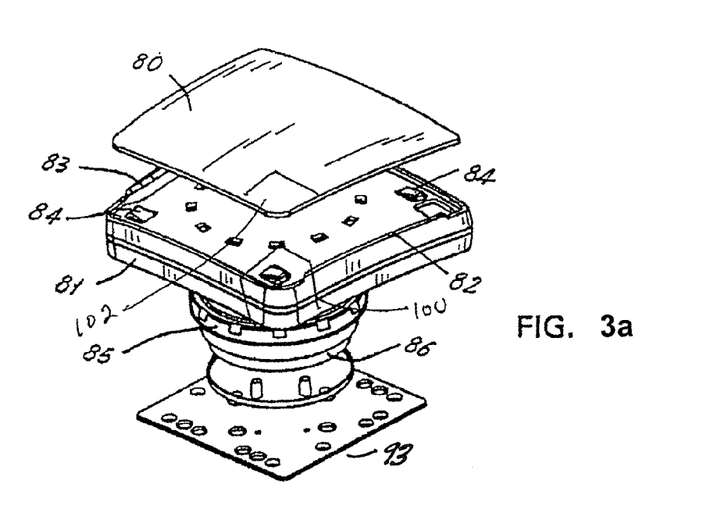
FIG. 3a-b are exploded views of one embodiment of a mirror unit of the present invention.
Figure 3B:
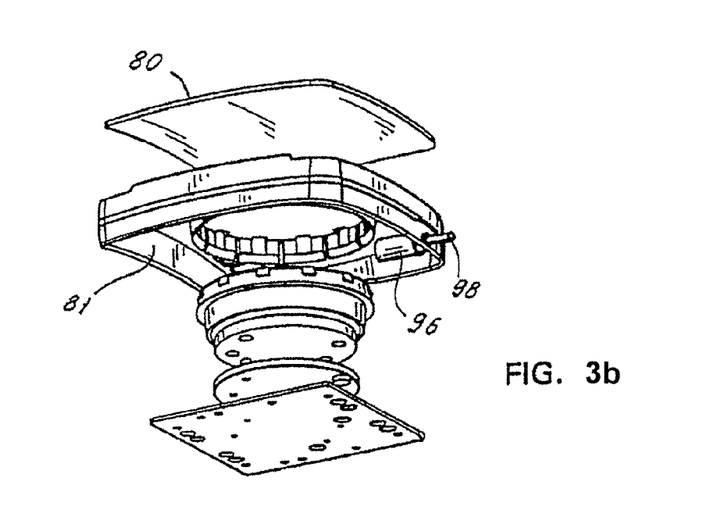

With reference to FIG. 3a, a more detailed drawing of an alternative embodiment of the convex-surfaced second mirror unit 18 is shown. The second mirror unit 18 comprises a substantially convex mirror 80, a convex mounting plate 81, a cup 85 and a swivel mechanism 86. A first cutout 100 in convex mounting plate 81 and a second cutout 102 in convex mirror 80 are provided such that a camera (not shown) may be inserted inline with the mirror. In alternative embodiments, section 102 is optionally transparent or a two way mirror that allows the camera to be able to view the area in the same direction as the rear view mirror. The swivel mechanism 86 comprises two motors (not shown) which are coupled via gearing to the cup 85 to enable motorized swiveling of the cup with respect to the swivel mechanism 86. The convex mounting plate 81 comprises a long snap 82, a short snap 83, and vibration tabs 84. With reference to FIG. 3b, the swivel mechanism 86 may optionally comprise an electromechanical solenoid 96, where the solenoid comprises a core 98 and a spring (not shown). The operation of the motorized features and anti-vibration features of the convex-surfaced second mirror unit 18 are substantially similar to the same features of the rectangularly shaped first mirror unit 16 and, therefore, a detailed recitation of the interconnection and operation of the aforementioned elements of the second mirror unit 18 is omitted. According to various embodiments of the present invention, the first mirror unit may also be moved manually.

In various embodiments a power supply is provided to power the motors in each of the first and second mirror units as well as a camera. In other embodiments, a separate power supply is provided for each component component or existing power supplies on the vehicle may optionally be used.

The shell housing 10, the flat mounting plate 61, the cup 65, the swivel mechanism 66, the connecting plate 73, the convex mounting plate 81, the cup 85, the swivel mechanism 86 and the connecting plate 93 may be manufactured from suitable plastics, metals, composite materials or the like. It is preferred that the above-listed elements be manufactured from suitable plastics. The mirror pole 20 and the hinge member 30 may also be manufactured from suitable plastics, metals, composite materials or the like; however, it is preferred that these elements be manufactured from suitable metals. As described above, it is most preferred that mirror pole 20 and the first and second support arms 26, 28 be manufactured from steel and the core material 23 be manufactured from aluminum.

Figures 4A, 4B, 4C:
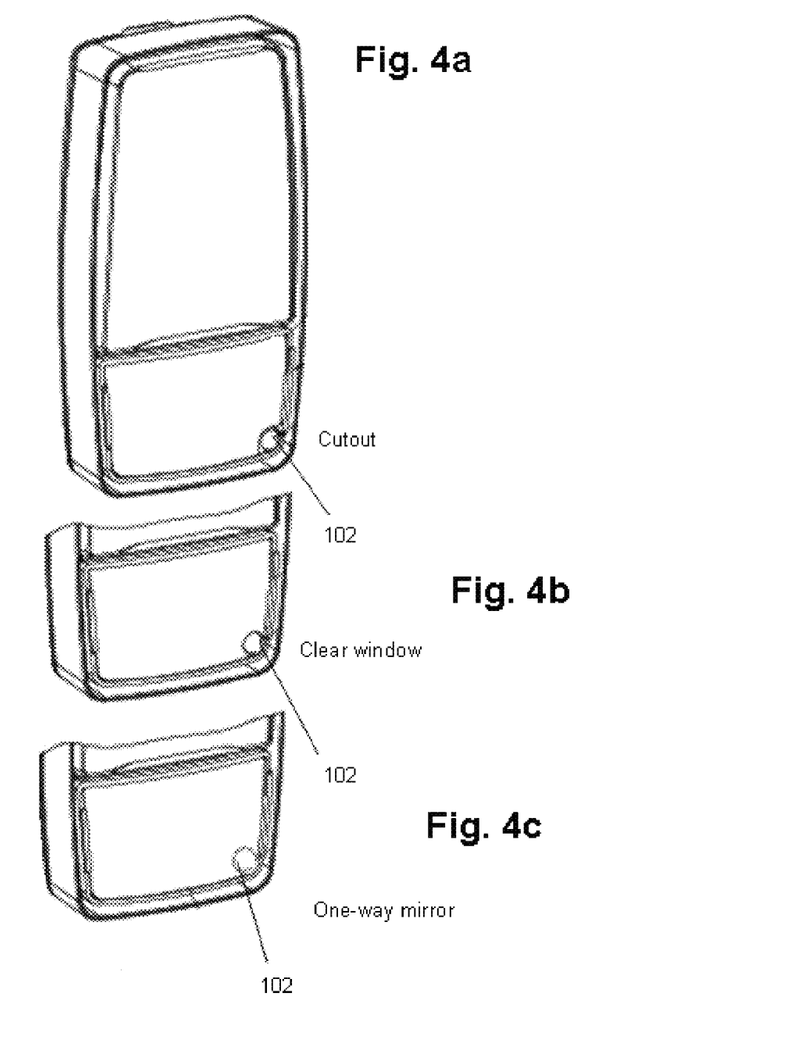
FIGS. 4a-c depict a window according to various embodiments of the present invention.

With reference to FIGS. 4a-c, a more detailed view of the camera disposition within the second mirror unit 18 is depicted.

Referring to FIG. 4a, an assembled apparatus according to one embodiment of the present invention is depicted. As shown, a housing is provided with a first mirror unit provided with a substantially rectangular mirror and a second mirror unit provided with a substantially convex mirror. In alternative embodiments, the shape and reflectivity characteristics of the first and second mirror units can be varied. The second mirror is advantageously provided with a cutout or opening 102, through which a camera captures images as described above. Referring to FIG. 4b, an alternative embodiment is depicted wherein the second mirror is provided with a transparent non-reflective window 102, through which a camera captures images as described above. FIG. 4c depicts an additional embodiment wherein all of the mirror is a one-way mirror or is provided with a window 102 comprising a one-way mirror. The one-way mirror allows the camera to capture images through the mirror without interrupting the surface of the mirror. Camera 104 is oriented with the convex mirror 80 through first cutout in convex mounting plate (not shown) and second cutout 102 in convex mirror 80. In alternative embodiments, an additional camera may also be used for the first mirror unit and/or alternatively the camera unit may be used for the first mirror unit, instead of the second mirror unit. In addition, in alternative embodiments, the rear view mirror can comprise any type of mirror unit that includes a camera, such as a mirror mounted inside the vehicle and/or outside the vehicle, such as a standard cross view mirror.

Figure 5A:
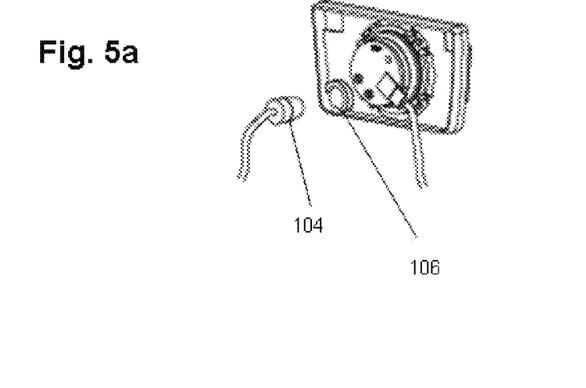
FIGS. 5a-b depict a connection mechanism for the camera according to various embodiments of the present invention.
Figure 5B:
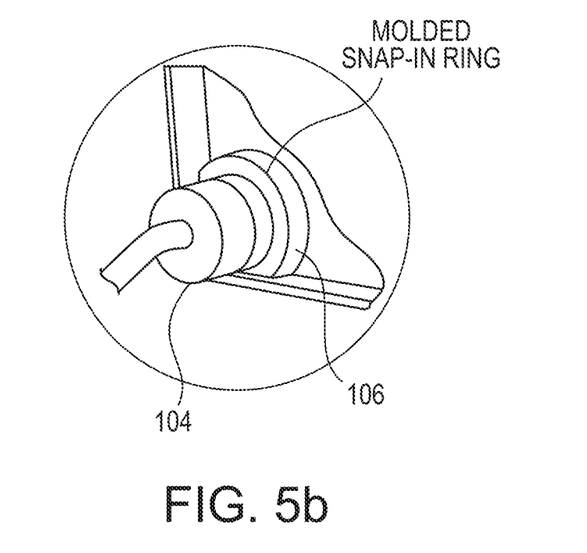

Referring to FIGS. 5a-b, connection mechanisms are depicted according to various embodiments of the present invention for connecting the camera 104 to a second mirror unit. Referring to FIG. 5a, according to one embodiment, a molded snap-in ring 106 is provided such that camera 104 is advantageously fixed to convex mounting plate 81 by snapping the camera 104 into place within the standard snap-in ring 106. Snap-in ring 106 may be configured in any number of shapes to accommodate cameras of varying shapes and sizes. Referring to FIG. 5b, a magnified view of an embodiment providing a molded snap-in ring 106 for securing camera 104 to a mounting plate is depicted.

Figure 6A:
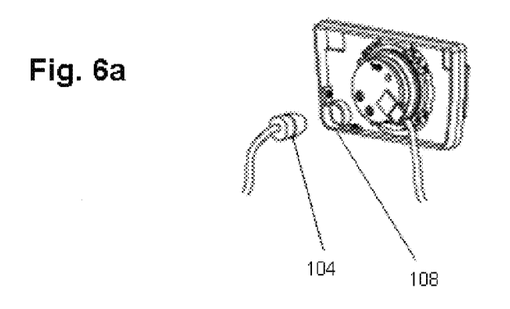
FIGS. 6a-b depict a connection mechanism for the camera according to various embodiments of the present invention.
Figure 6B:
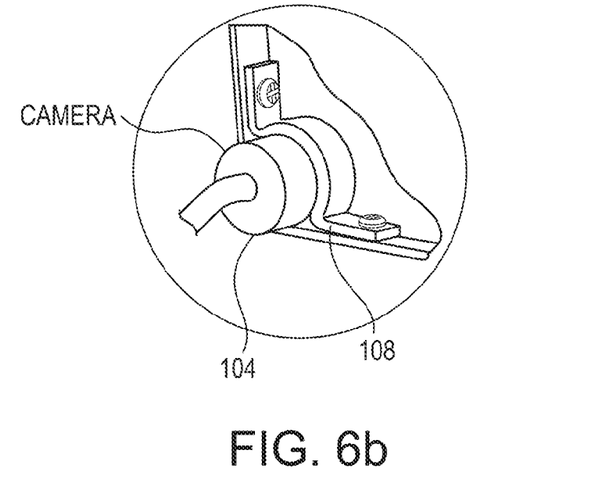

Referring to FIG. 6a, according to another embodiment, a mounting bracket 108 is provided for securing camera 104 to convex mounting plate 81. Camera 104 is secured to convex mounting plate 81 by at least one screw inserted into mounting bracket and attached to mounting bracket 108. As will be understood, the camera may be connected to the mounting plate in any reasonable fashion without departing from the spirit of the invention, including but not limited to screwing the camera into the mounting plate with a thread on the camera that mates to a thread in the mounting plate, pins, rivets, or one or more brackets secured by one or more screws or pins. Referring to FIG. 6b, a magnified view of an embodiment providing a mounting bracket 108 for securing camera 104 to a mounting plate is depicted.

Figure 7A:
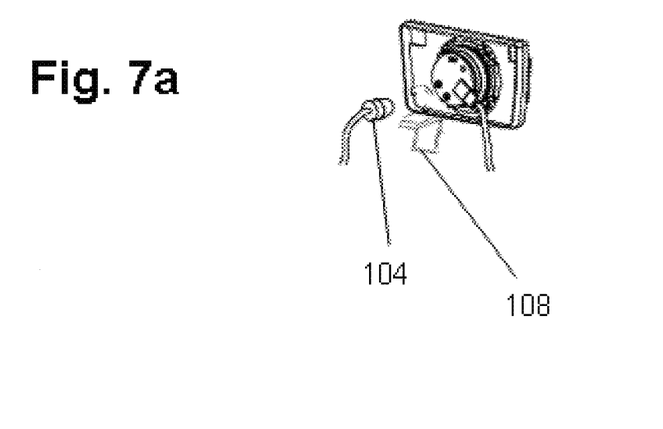
FIGS. 7a-b depict a connection mechanism for the camera according to various embodiments of the present invention.
Figure 7B:
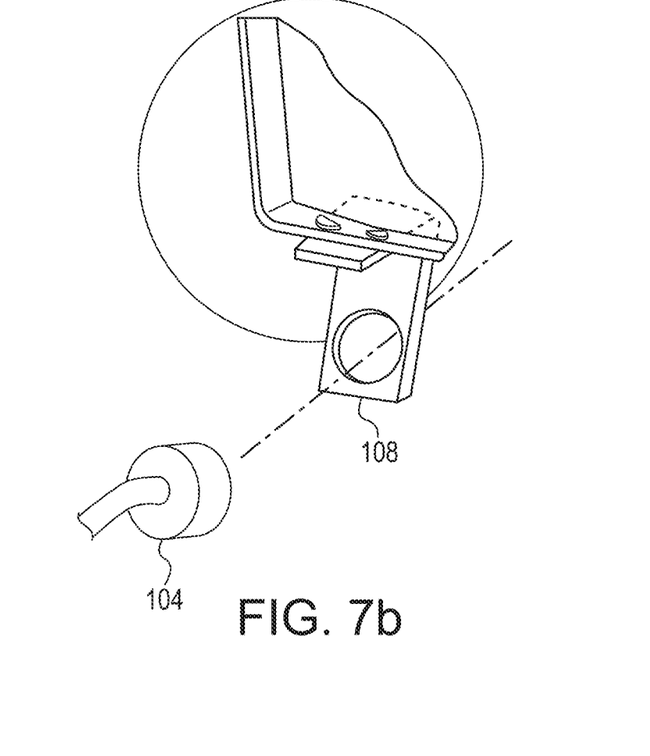

In some embodiments of the invention, the camera 104 is attached to mounting plate 81 such that the camera is advantageously moved according to the movements of the swivel mechanism 86 (motorized and/or manual adjustment mechanism) along with convex mirror 80, however, in alternative embodiments, a separate motor and/or swivel mechanism may be provided for the camera such that it may be moved independently from the convex mirror 80. Referring to FIG. 7a, according to an additional embodiment of the present invention, a bracket 108 is provided to secure the camera 104. In some embodiments the bracket 108 is attached to mounting plate 81 such that camera 104 moves according to the movements of the swivel mechanism 86. According to other embodiments, bracket 108 is advantageously connected to an additional motor and swivel mechanism that allows the camera 104 to be moved independently of mounting plate 81. In other embodiments bracket 108 is attached to housing 10 such that camera 104 provides a fixed field of view. FIG. 7b provides a magnified view of an embodiment providing a mounting bracket 108 for securing camera 104 according to the previously described embodiment.

According to other embodiments of the present invention, bracket 108 may be provided to attach camera 104 to provide a view to the front of the vehicle. In other embodiments, an additional camera and bracket may be provided such that one camera provides a view to the rear of the vehicle and another camera provides a view to the front of the vehicle. In other embodiments, a hole is provided in housing 10 to allow an additional camera to provide a view to the front of the vehicle.

In alternative embodiments, the camera is aided with additional lighting attached to the housing, integrated within the housing and/or attached to the side of the vehicle. The light source may provide light in the visible range, infra-red, etc. According to certain embodiments, the camera is sensitive to the particular wavelength of the light source.

Figure 8:
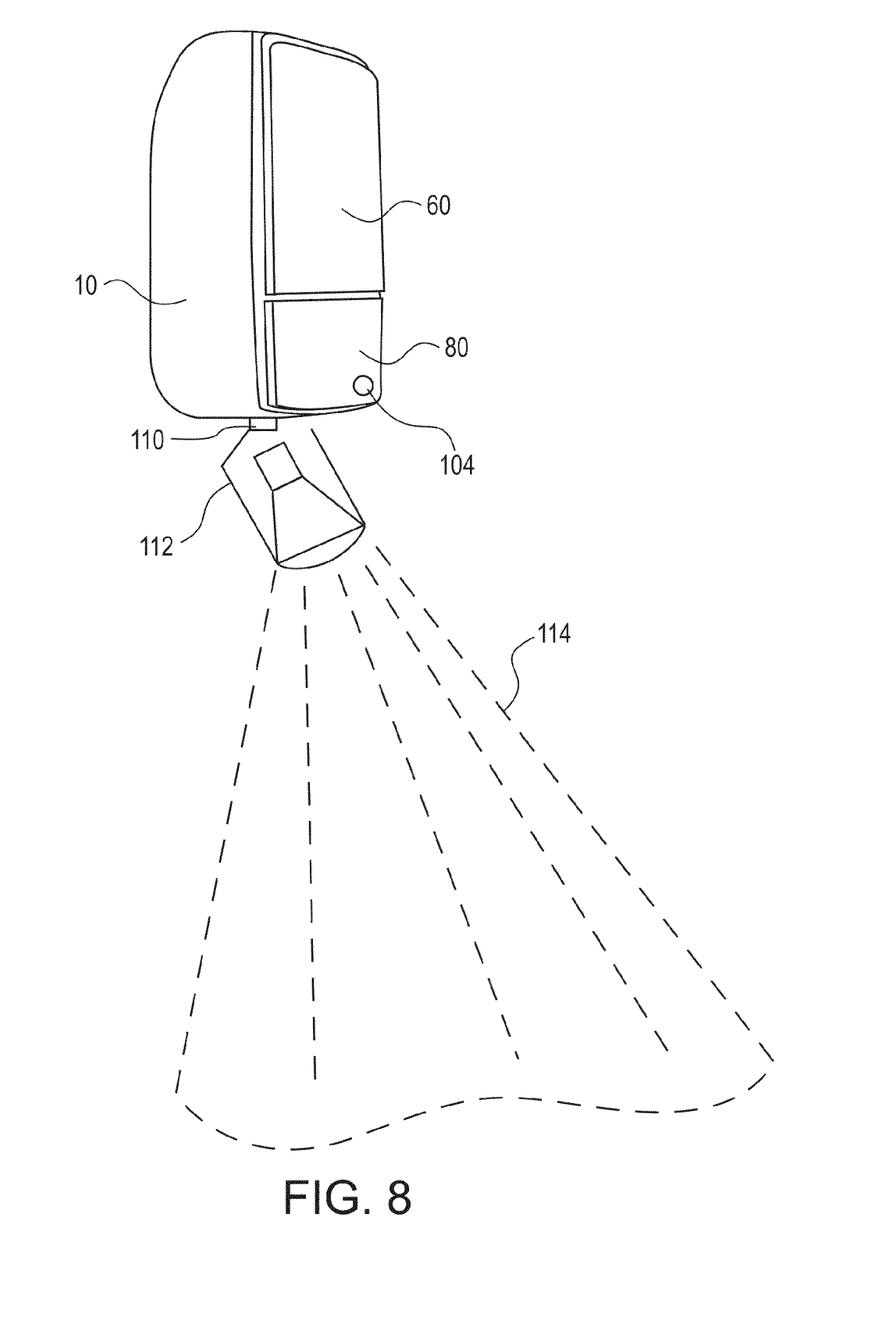
FIG. 8 depicts an embodiment of a mirror unit provided with a light source.
Figure 9:
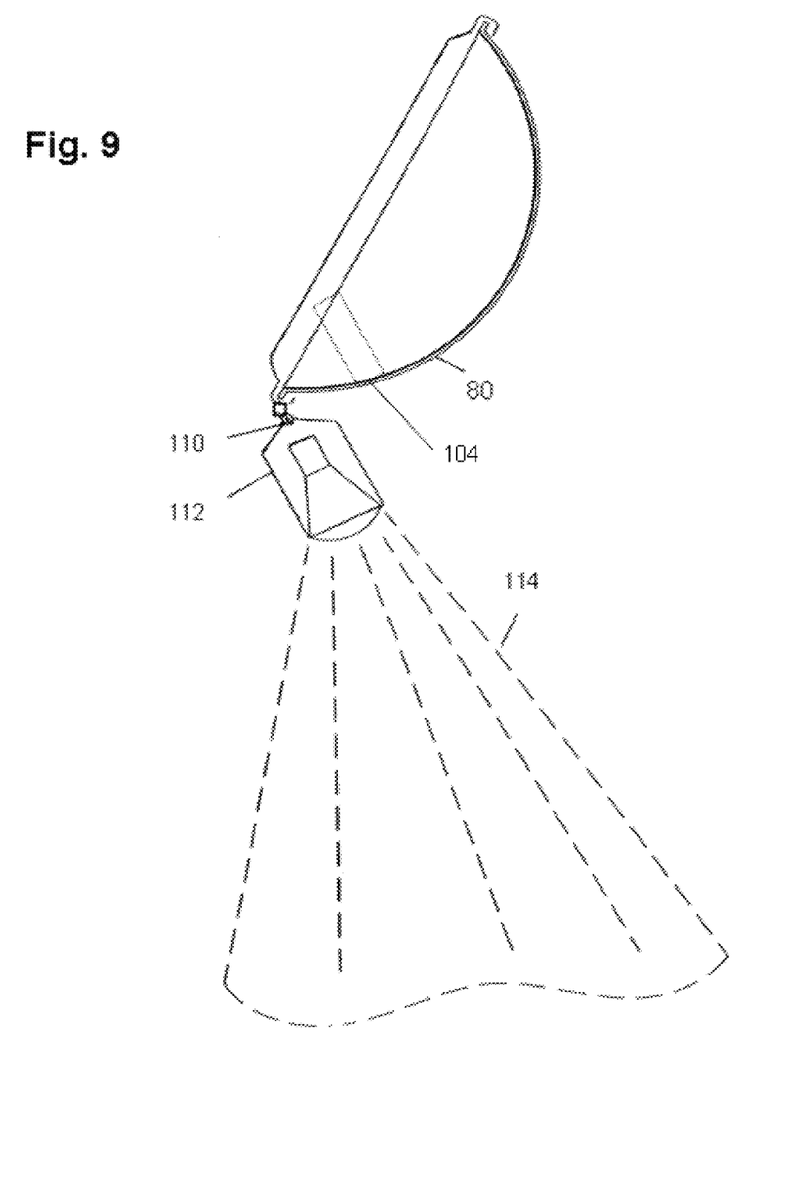
FIG. 9 depicts an alternative embodiment of a mirror unit provided with a light source.

Referring to FIG. 8, an example of one embodiment of a mirror unit provided with a light source is depicted. Light 112 is connected with a bracket 110 to the mirror unit and provides an area of illumination 114. Bracket 110 may be fixed or may be hinged to allow light 112 to be directed in various angles manually. In some embodiments, bracket 110 is coupled to a motor to allow motorized movement of the light 112 by a driver. According to certain embodiments, the area of illumination 114 may be varied by providing an iris or shade over the light 112. In other embodiments, the area of illumination 114 may be varied by altering the power provided to the light 112. FIG. 9 depicts an alternate embodiment of a light 112 connected externally to a mirror unit with a bracket 110.

Referring to FIG. 9, an example of an embodiment of a mirror unit provided with a light source is depicted. Light 112 is connected with a bracket 110 to the mirror unit and provides an area of illumination 114. According to various embodiments, light 112 is connected to mirror unit with standard connection means, such as screws, pins, rivets, etc. Bracket 110 may be fixed or may be hinged to allow light 112 to be directed in various angles manually. In some embodiments, bracket 110 is coupled to a motor to allow motorized movement of the light 112 by a driver. Camera 104 is provided internally to the mirror unit and is provided a viewing angle through a cutout, transparent window or one-way mirror. Camera can be coupled to a motor to allow motorized movement of the camera within the mirror unit to adjust the camera viewing angle. According to certain embodiments, the area of illumination 114 may be varied by providing an iris or shade over the light 112. In other embodiments, the area of illumination 114 may be varied by altering the power provided to the light 112. FIG. 9 depicts an alternate embodiment of a light 112 connected externally to a mirror unit with a bracket 110.

Figure 10:
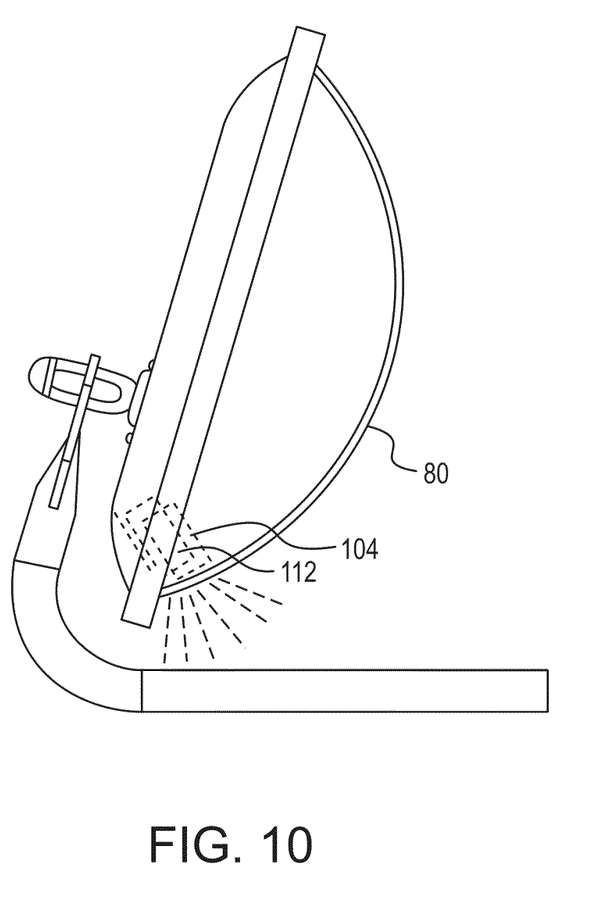
FIG. 10 depicts another alternative embodiment of a mirror unit provided with a light source.

FIG. 10 depicts one example of an alternative embodiment of a mirror unit provided with a light source 112. As shown in this example, light source 112 is internally contained within a mirror unit. In addition, camera 104 is also internally contained within the mirror unit. According to certain embodiments, light source 112 may provide illumination through a cutout window, or a transparent window. It is envisioned that illumination from light source 112 may be angled manually or a motor may be provided to allow the light source to be rotated or angled electronically by the driver. According to various embodiments, one or both of the camera and light source may be internally contained within the mirror unit or may be fixed externally to the mirror unit with connection means as described elsewhere in this disclosure.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A rear view mirror system configured to be mounted on an external portion of a vehicle, comprising:
    a mirror housing and mounting system configured to be mounted to the external portion of the vehicle using at least one mounting arm; and
    a mirror assembly disposed within said housing, said mirror assembly comprising:
    a first mounting plate mounted to and in said mirror housing;
    an adjustment mechanism mounted to said first mounting plate and in said mirror housing;
    a second mounting plate mounted to said adjustment mechanism and in said mirror housing and including a camera connection area disposed therein;
    a camera mounted to the camera connection area of said second mounting plate and in said mirror housing and configured to provide an image to a display screen in view of a driver within the vehicle; and a mirror mounted to said second mounting plate, adjustable within the mirror housing with the camera and the second mounting plate responsive to the adjustment mechanism and configured to provide a viewing area aligned with said camera connection area for said camera to view through while reflecting an area to the rear of the vehicle.

2. The rear view mirror system of claim 1, wherein the viewing area for said camera further comprises:
a first window in the mirror comprising at least one of a cutout, a transparent element, and a one-way mirror element, and the camera coupled to the second mounting plate and aligned with respect to the first window.

3. The rear view mirror system of claim 1, wherein said adjustment mechanism comprises a motorized swivel mechanism configured to move the mirror and the camera simultaneously in at least one of a horizontal and vertical direction.

4. The rear view mirror system of claim 3, wherein the motorized swivel mechanism comprises
at least one electromechanical solenoid.

5. The rear view mirror system of claim 1, further comprising:
a connection mechanism connecting the camera to the camera connection area of said second mounting plate, the connection mechanism including at least one of a thread mating to thread on the camera, a snap-in mechanism, pins, rivets, a bracket held by screws, a bracket held by pins, and a bracket held by rivets.

6. The rear view mirror system of claim 1, wherein said second mounting plate further comprises:
at least one tab configured to affix the mirror to the second mounting plate, the at least one tab elastically biased to prevent vibration in the mirror.

7. The rear view mirror system of claim 1, further comprising at least one light source at least one of connected to said rear view mirror system, disposed on the vehicle, and integrated within the mirror housing.

8. The rear view mirror system of claim 1, further comprising:
a third mounting plate mounted and in said mirror housing;
a second adjustment mechanism mounted to said third mounting plate;
a fourth mounting plate mounted to said second adjustment mechanism; and
a second minor mounted to said fourth mounting plate.

9. The rear view mirror system of claim 8, wherein said fourth mounting plate includes a second camera connection area, and wherein said rear view mirror system further comprises:
a second camera mounted to the second camera connection area, and the second mirror configured to provide a second viewing area for said second camera mounted to said fourth mounting plate while reflecting a second area with respect to the vehicle.

10. The rear view mirror system of claim 1, further comprising:
a second camera, the second camera configured to provide a viewing area to the front of the vehicle.

11. The rear view mirror system of claim 1, wherein:
the camera is mounted to the camera connection area disposed at least one of in and on the second mounting plate.

12. A method of assembling a rear view mirror system configured to be mounted on an external portion of a vehicle, comprising:
mounting a first mounting support to and in a mirror housing configured to be mounted to the external portion of the vehicle using at least one mounting arm;
mounting an adjustment mechanism to the first mounting support and in said mirror housing;
mounting a second mounting support to the adjustment mechanism and in said mirror housing, said second mounting support including a camera connection area disposed therein;
mounting a camera to the camera connection area of said second mounting support and in said mirror housing, said camera configured to provide an image to a display screen in view of a driver within the vehicle; and
mounting a mirror to the second mounting support and in said minor housing, said mirror adjustable within the mirror housing with the camera and the second mounting plate responsive to the adjustment mechanism and configured to provide a viewing area aligned with said camera connection area for the camera to view through while reflecting an area to the rear of the vehicle.

13. The method of claim 12, further comprising the step of:
mounting at least one light source least one of connected to the mirror housing, disposed on the vehicle, and integrated within the mirror housing.

14. A rear view mirror system configured to be mounted on an external portion of a vehicle, comprising:
a mirror housing and mounting system configured to be mounted to the external portion of the vehicle using at least one mounting arm; and
a mirror assembly disposed within said housing, said mirror assembly comprising:
a first mounting support mounted to and in said mirror housing;
an adjustment mechanism mounted to said first mounting support and in said mirror housing;
a second mounting support mounted to said adjustment mechanism and in said mirror housing, said second mounting plate having a front side and a back side and an opening disposed therein;
a camera mounted to the back side of said second mounting support and in said mirror housing, said camera positioned to view through said opening in said second mounting plate and configured to provide an image to a display screen in view of a driver within the vehicle; and
a mirror mounted to the front side of said second mounting support, adjustable within the mirror housing with the camera and the second mounting plate responsive to the adjustment mechanism and configured to provide a viewing area aligned with said opening for said camera to view through while reflecting an area to the rear of the vehicle.

* * * * *